United States Patent Office 3,032,399
Patented May 1, 1962

3,032,399
PREPARATION OF METAL BORIDES
Ralph M. Hoke, Fair Oaks, Calif., assignor to Callery Chemical Company, Pittsburgh, Pa., a corporation of Pennsylvania
No Drawing. Filed Mar. 10, 1959, Ser. No. 798,345
8 Claims. (Cl. 23—204)

This invention relates to the preparation of metal borides and more particularly to the preparation of metal borides from alkali metal borohydrides.

The metal borides are binary compounds of boron with a metal. The stoichiometries of these compounds vary and the proportions of metal and boron present do not appear to be strictly governed by valency relationships, so that many borides are often regarded as interstitial compounds. They exist in various types, conforming to empirical formulas such as $MB$, $MB_2$, $MB_4$, $MB_6$, $M_2B$, $M_3B_2$ and $M_3B_4$, and often the same metal forms several types of borides.

As a class, the metal borides are characterized in their physical properties by their high melting points, extreme hardness, and high electrical conductivity. Chemically, they are generally relatively inert, although they may be attacked by strong oxidizing agents such as chlorine or hydrogen peroxide. Their properties make the metal borides useful as abrasives, refractories, and electron emitters.

Heretofore, the metal borides have been obtained by several methods. The electrolysis of fused borates has been the most generally successful of these methods, but in addition to the requirement for electrical power, this method has other disadvantages in that the products are impure and require considerable purification to be useful. Other methods utilize the metal of the desired boride as the starting material, which is undesirable because it is difficult to obtain most metals in the pure state.

The method of this invention has several advantages over prior methods, but perhaps the most significant of these is that the starting materials, i.e., the metal salts and oxides, are easily obtained in the required purity. A further advantage in this connection is that the very high product purities required for certain applications for which metal borides are used can be attained by leaching the products produced to remove the small amounts of impurities which may be present. Still another advantage is that no solvent is required, thus permitting the use of high temperatures at which the reaction takes place in such a manner that the boride obtained has the desired properties.

This invention in its broad aspect comprises the production of metal borides by contacting an alkali metal borohydride with a metal salt or oxide at elevated temperatures. This method may be used to prepare a great variety of metal borides and may be carried out over a wide range of temperatures. While the minimum temperature of operation depends to some extent upon the particular reactants employed, 300° F. is generally the lowest temperature at which satisfactory results are attained. Because of the stability of the metal borides to decomposition, very high temperatures can be used and the use of high temperatures is limited only by economic considerations such as the materials of construction used for the equipment in which the process is carried out.

I have found that the salts and oxides of a number of metals can be used in the process described herein to prepare the corresponding metal borides. These metals include all the metals of groups IIIA, IVB, VB, VIB, VIIB, and VIII in the conventional form of the periodic chart of the elements as given in the Handbook of Chemistry and Physics, 35th Edition, 1953–54 (Chemical Rubber Publishing Co., Cleveland), at pages 392 and 393. Furthermore, several types of compounds of these metals may be used, including the halides, oxides and the oxy-ion salts of these metals. Among the compounds which may be used are halides such as aluminum chloride ($AlCl_3$), gallium bromide ($GaBr_3$), titanium tetrafluoride ($TiF_4$), zirconium bromide ($ZrBr_3$), ferric chloride ($FeCl_3$), ruthenium chloride ($RuCl_3$) and manganese chloride ($MnCl_2$); oxides such as vanadium sesquioxide ($V_2O_3$), manganese oxide ($MnO$), nickel oxide ($N_2O_3$), cobalt oxide ($CoO$), and titanium oxide ($TiO$); and oxy-ion salts such as calcium metazirconate ($CaZrO_3$), potassium tungstate ($K_2WO_4$), thallium vanadate ($TlVO_3$), sodium chromate ($NaCrO_4$) and sodium molybdate ($Na_2MoO_4$). Salts of boron compounds, such as sodium metaborate ($NaBO_2$) may also be used to produce "boron boride," which is free boron.

The following examples will serve to illustrate the method and practice of this invention, but are not to be construed as imposing limitations thereon.

*Example I.*—Sodium tungstate, $Na_2WO_4$, was heated to drive off any water of crystallization. 2.94 grams of the dry salt were ground in a mortar with 0.76 gram of sodium borohydride, $NaBH_4$. The mixture was heated in an argon atmosphere to 1280° F. and held at about that temperature for one hour. After cooling the product was washed with water and methanol. 1.75 grams of tungsten boride, a black powder, were obtained.

*Example II.*—2.35 grams of zirconium tetrachloride, $ZrCl_4$, and 1.42 grams of sodium borohydride were ground together to form an intimate mixture. This mixture was placed in a porcelain boat and heated in a furnace. At 300° F. some evidence of reaction was visible. When the temperature had reached 900° F. the material in the boat became very black. The temperature was increased to approximately 1000° F. and held there for one-half hour. No evidence of reaction was visible during the last 20 minutes. 2.54 grams of crude zirconium boride was obtained which upon purification by leaching with water yielded 0.89 gram of pure product.

*Example III.*—2.5 grams of sodium metavanadate, $NaVO_3$, which had been heated to drive off water was mixed with 2.5 grams of sodium borohydride and the mixture heated in an argon atmosphere. As the temperature rose gas was evolved and at about 550° F. the material began to darken in color. The temperature was raised to 1080° F. and held there for one hour. Upon cooling the products were washed with ammonium hydroxide and dried under vacuum. The product, 1.19 grams of vanadium boride, was a black pyrophoric powder.

These and other tests have established the general applicability of this method, both as to the metal salt and to the alkali metal borohydride. Thus, although sodium borohydride is used in the examples given above, other alkali metal borohydrides, such as lithium borohydride and potassium borohydride, may also be used.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:
1. A method of producing a metal boride which comprises reacting an alkali metal borohydride with a metal compound selected from the group consisting of halides, oxides, and oxy-ion salts of metals in groups IIIA, IVB, VB, VIB, VIIB and VIII at a temperature substantially above 300° F. in the absence of water as a solvent, in a closed system, and in the presence of an inert gas, and then leaching the crude reaction product with an aqueous medium to recover the metal boride thus formed.

2. A method according to claim 1 in which the alkali metal borohydride is sodium borohydride.

3. A method according to claim 1 in which the metal compound is a halide.

4. A method according to claim 1 in which the metal compound is an oxide.

5. A method according to claim 1 in which the metal compound is an oxy-ion salt.

6. A method of producing tungsten boride which comprises reacting sodium borohydride with sodium tungstate at a temperature substantially above 300° F., in the absence of water as a solvent, in a closed system, and in the presence of an inert gas, and then leaching the crude reaction product with an aqueous medium to recover the tungsten boride thus formed.

7. A method of producing vanadium boride which comprises reacting sodium borohydride with sodium vanadate at a temperature substantially above 300° F., in the absence of water as a solvent, in a closed system and in the presence of an inert gas, and then leaching the crude reaction product with aqueous medium to recover the metal boride thus formed.

8. A method of producing zirconium boride which comprises contacting sodium borohydride with zirconium chloride at a temperature substantially above 300° F., in the absence of water as a solvent, in a closed system, and in the presence of an inert gas, and then leaching the crude reaction product with an aqueous medium to recover the zirconium boride thus formed.

References Cited in the file of this patent

UNITED STATES PATENTS

| | | |
|---|---|---|
| 2,657,975 | Hinkamp | Nov. 3, 1953 |
| 2,888,326 | Schechter et al. | May 26, 1959 |

OTHER REFERENCES

Hockstra et al.: "Journal of the American Chemical Society," vol. 71, pp. 2488–2492 (July 1949).

Paul et al.: "Industrial and Engineering Chemistry," vol. 44, pp. 1007–1010 (May 1952).

Babor et al.: "General College Chemistry," 1940, p. 88.